United States Patent [19]
Tsuchiya et al.

[11] 3,848,936
[45] Nov. 19, 1974

[54] ENDLESS TRACK DEVICE FOR VEHICLES

[75] Inventors: Toshio Tsuchiya, Ooi-machi; Osamu Takeuchi, Niiza, both of Japan

[73] Assignee: Honda Giken Kogyo Kabushiki Kaisha, Tokyo, Japan

[22] Filed: Feb. 27, 1973

[21] Appl. No.: 336,355

[30] Foreign Application Priority Data
Mar. 1, 1972 Japan................................ 47-21223

[52] U.S. Cl. ............................................ 305/35 EB
[51] Int. Cl. .............................................. B62d 55/24
[58] Field of Search .................................. 305/35 EB

[56] References Cited
UNITED STATES PATENTS
2,707,658    5/1955    Grenier........................ 305/35 EB
FOREIGN PATENTS OR APPLICATIONS
446,088    3/1968    Switzerland...................... 305/35 EB
446,089    3/1968    Switzerland...................... 305/35 EB

*Primary Examiner*—Philip Goodman
*Attorney, Agent, or Firm*—Waters, Roditi, Schwartz & Nissen

[57] ABSTRACT

An endless track device comprising a drive wheel and at least one guide wheel arranged in the medial plane of the vehicle body and longitudinally aligned with each other and an endless track having a substantial width and being comprised of a medial portion held in engagement with the drive and guide wheels and side portions flexible relative to the medial portion and effective to support part of the weight of the vehicle. The device enables the vehicle to run stably over any rough surface with reduced rolling or lateral rocking movement without slip, such as on snow, ice and the like.

1 Claim, 5 Drawing Figures

FIG. I

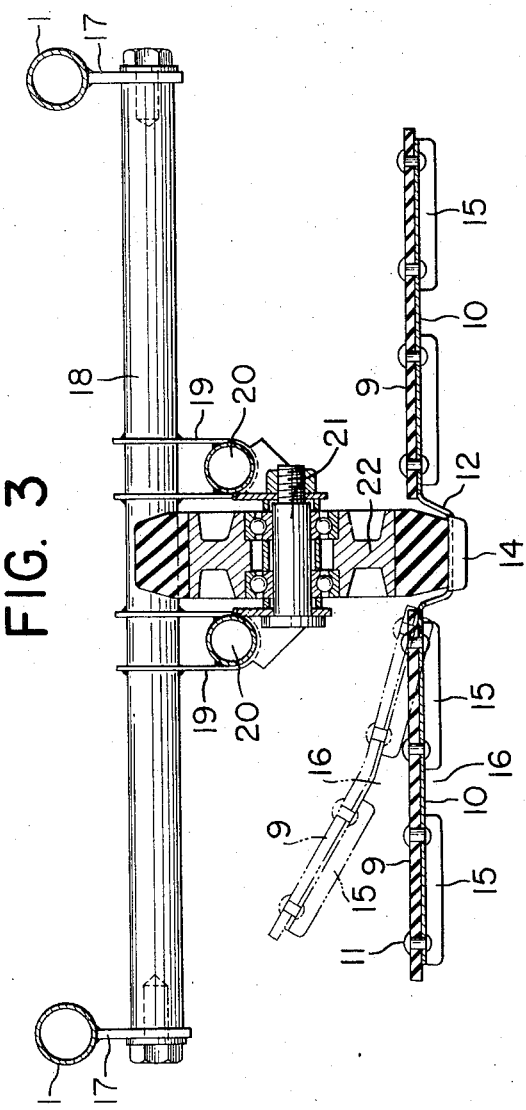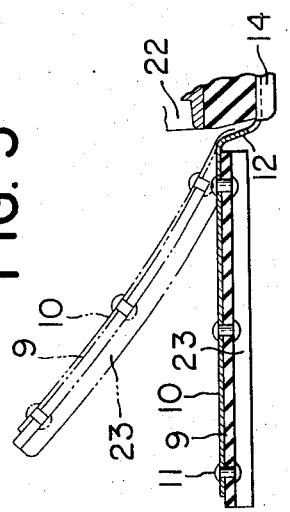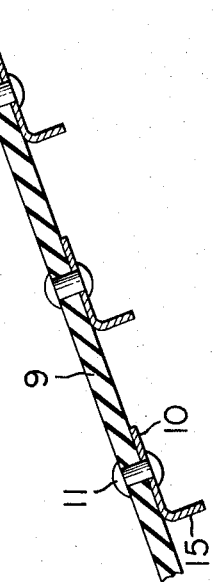

ENDLESS TRACK DEVICE FOR VEHICLES

BACKGROUND AND SUMMARY OF THE INVENTION

This invention relates generally to endless, self-laid tracks, and more particularly to those for vehicles usable on snow, ice or the like, and is intended to enable such kind of vehicle to run stably with reduced rolling or lateral rocking movement without slip, irrespective of the surface conditions.

According to the present invention, there is provided a novel endless track device for vehicles of the kind described which comprises a drive wheel and at least one guide wheel arranged in the medial plane of the vehicle body in longitudinally aligned relation with each other and an endless track having a large width and medially held in engagement with the drive and guide wheels thereby to enable the vehicle to run with an increased lateral stability irrespective of any irregularities of the surface over which the vehicle travels.

Further, the opposite side portions of the track are made flexible relative to the medial portion thereof so as not to impair the lateral stability of the vehicle while serving to support a substantial part of the weight thereof.

BRIEF DESCRIPTION OF THE DRAWINGS

The present invention will be described hereinafter in more detail with reference to the accompanying drawings, which illustrate one preferred embodiment of the invention and in which:

FIG. 3 is a cross-sectional view taken along the line III—III in FIG. 1;

FIG. 4 is an enlarged cross-sectional view taken along the line IV—IV in FIG. 2; and FIG. 5 is a transverse corss-sectional view of a modified form of the side portions of an endless track forming part of the inventive device.

DESCRIPTION OF THE PREFERRED EMBODIMENT

Figure 1:
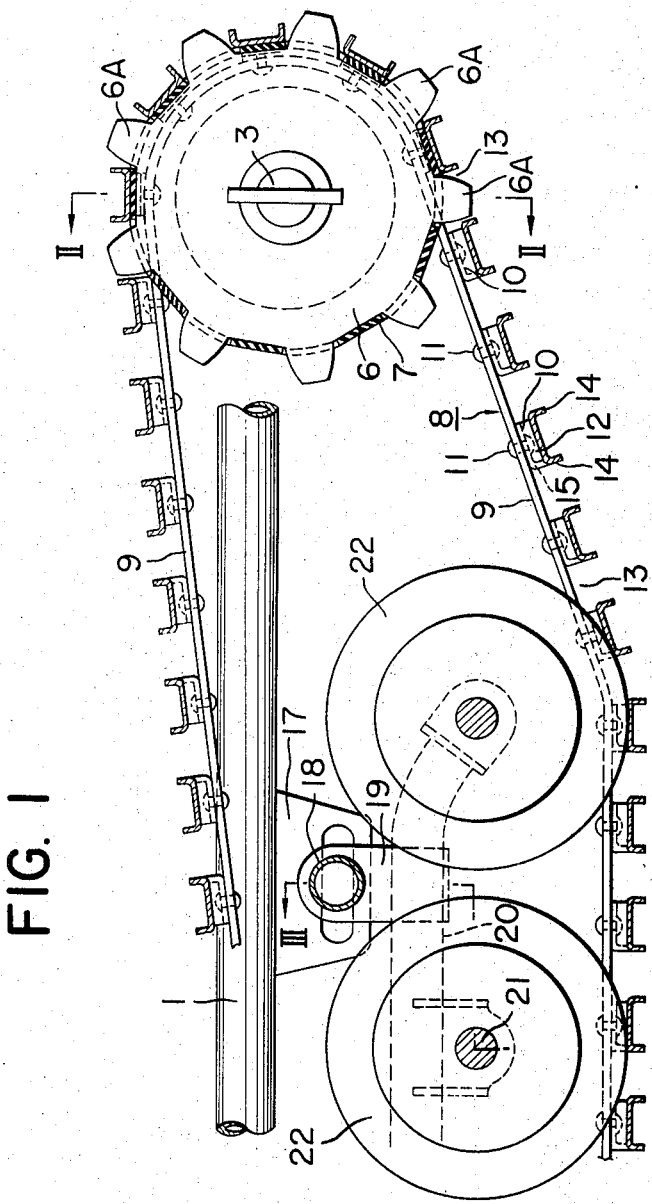
FIG. 1 is a fragmentary side elevation, partly in section, of the endless track device according to the invention, showing the front portion thereof.
Figure 2:
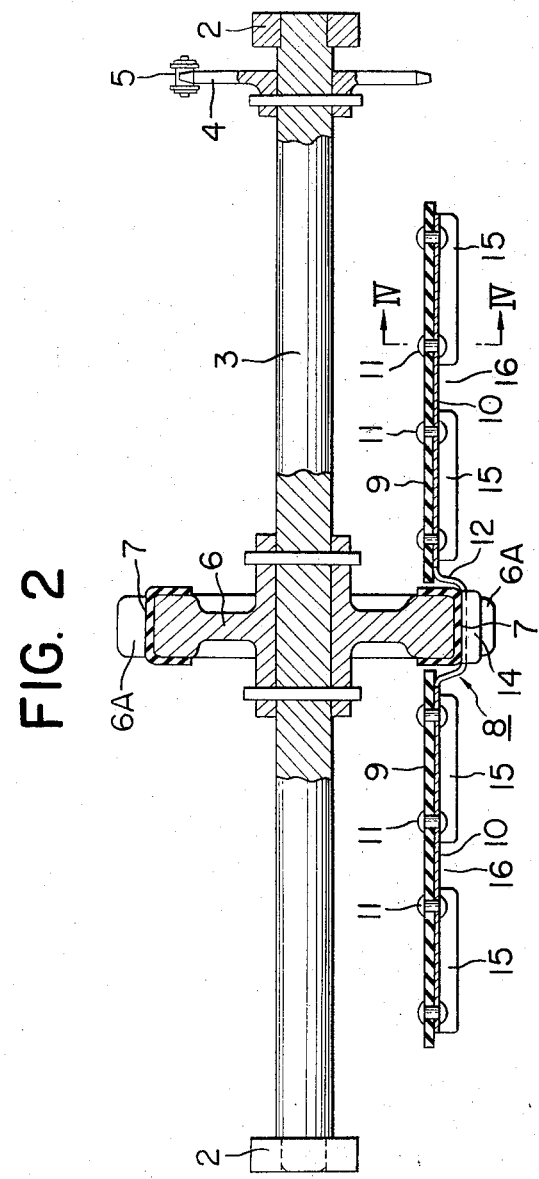
FIG. 2 is a cross-sectional view taken along the line II—II in FIG. 1.

In FIG. 1, a horizontal frame 1 of a vehicle is shown, the latter being usable on snow, ice or the like and, in FIG. 2, bearing brackets 2 are secured to the frame 1 to support a drive shaft 3 transversely of the vehicle body. Fixedly mounted on the drive shaft 3 is a chain sprocket wheel 4 which is engaged with a chain belt 5 which in turn is driven by an engine (not shown) mounted on the vehicle body.

A drive wheel 6 is fixedly mounted on the drive shaft 3 at the center thereof. Formed along the periphery of the drive wheel 6 are a multitude of radially extending driving teeth 6A with cushioning sheets 7 of rubber or the like material arranged therebetween in fixed relation to the rim portion of the drive wheel 6.

An endless, caterpiller track 8 is shown, having a largely extended width and medially held in engagement with the drive wheel 6, as clearly seen in FIG. 2. The track 8 is principally composed of a pair of parallel annular or endless belts 9 of rubber or the like material extending longitudinally thereof on the opposite sides of the drive wheel 6 and a multitude of generally transversely extending bars 10 formed of highly flexible material such as steel sheet and each secured to the exterior side of the belts 9 by rivets means 11 to interconnect the two belts.

Further, the connecting bars 10 are each bent outwardly at the center to form a U-shaped portion 12 and in operation the driving teeth 6A of the drive wheel 6 are successively received in the spaces 13 between the U-shaped portions 12 of the successive connecting bars 10 for driving engagement with the caterpillar track 8, as seen in FIG. 1. The forward and rearward edges of the U-shaped portions 12 are bent outwardly to form central scraper blades 14. Further, lateral scraper blades 15 are also included, shaped on the connecting bars 10 by outwardly bending the rearward edges of their portions which are jointed with the belts 9. The bar portions jointed with the annular belts 9 are formed with a plurality of such scraper blades 15 appropriately spaced from each other so that the connecting bars 10 may be flexed together with the belts 9 as shown in FIG. 3.

Referring to FIGS. 1 and 3, bracket plates 17 are secured to the horizontal frame 1 on the opposite sides thereof, and a transversely extending rod 18 is fixed at the opposite ends to the respective bracket plates 17. A pair of supporting rods 20 are secured to the middle portion of the fixed rod 18 through the intermediary of respective connecting pieces 19 jointly to serve the purpose of supporting a pair of wheel shafts 21, on which respective guide wheels 22 are rotatably mounted for peripheral engagement with the caterpillar track 8 along the medial portion thereof including the U-shaped portions 12 of the connecting bars 10.

In operation of the caterpillar track device constructed as described above, the drive wheel 6 is driven to rotate the track 8, and the medial portion of the latter, including the U-shaped portions 12 and the scraper blades 14 of the connecting bars 10, is pushed into the snow or ice surface over which the track 8 is laid thereby to effectively prevent any transverse slip of the track.

On the other hand, the side portions of the track 8, including the belts 9 and the side portions of connecting bars 10 formed with scraper blades 15, are brought into pressure engagement with the snow or ice surface to serve the purpose of driving the vehicle forward in cooperation with the medial portion of the track.

In this operation, the belts 9 can be flexed up and down together with the connecting bars 10 according to the irregularities of the surface regions on which the side portions of the track are laid and this enables the vehicle to run stably with a minimum of rolling or lateral rocking movement just like a motorcycle running over snow or ice.

Also, the side portions of the track 8, flexible under pressure of engagement with the surface, serve to support a substantial part of the weight of the vehicle, helping to substantially increase the lateral stability of the vehicle during its travel. It will be noted that the same effect is obtained also when the vehicle is tilted sidewise relative to the surface in changing the direction of travel.

A modification of the caterpillared respectively track is shown in FIG. 5. In this modification, the connecting bars 10 are secured to the inside of the belts 9 by rivet means 11 and are formed with scraper blades 23 extending continuously along the respective belts 9 and projecting outwardly beyond the outer peripheries thereof, instead of the spaced shorter blades 15 formed in the embodiment described above.

As apparent from the foregoing description, the device of the present invention is advantageous in that it enables vehicles to run over snow, ice or the like stably with peculiarly reduced rolling or lateral rocking movement irrespective of the irregularities of the surface over which it travels and without slipping sidewise.

It will be readily appreciated that the device of the present invention is particularly suitable for a sleighing vehicle of the type including a sleighed, front riding section and a caterpillared respectively rear drive section having an endless track therein.

While one preferred embodiment of the present invention has been shown and described herein, it will be apparent to those skilled in the art that various changes and modifications may be made therein without departing from the spirit and scope of the invention.

What is claimed is:

1. An endless track device for vehicles usable on snow, ice and the like, comprising: a drive wheel supported by the body of a vehicle in a longitudinal and medial plane thereof and having a plurality of radially extending driving teeth formed around its periphery; at least one guide wheel also supported by the vehicle body in longitudinally aligned relation with said drive wheel; an endless track consisting of a pair of flexible endless belts arranged on opposite sides of said drive wheel and a plurality of flexible connecting bars made of steel sheet extending transversely of said belts for interconnecting them on their exterior surfaces with a definite spacing between any adjacent two of said connecting bars; the latter having U-shaped groove portions formed at the medial portions thereof for engagement with respective peripheral portions of said drive wheel and said guide wheels, and the remaining opposite side portions being flexible relative to said groove portions; said opposite side portions being engageable with the surface over which the vehicle travels to support a part of its weight; said driving teeth being successively received in spaces between said groove portions for driving engagement with said endless track; said connecting bars having central and side scraper blades respectively formed on edges thereof at said groove portions and said opposite side portions; said central blades projecting more outwards than said side blades.

* * * * *